March 24, 1964   O. F. LOHSE   3,126,155
SILVER IODIDE CLOUD SEEDING GENERATOR
Filed May 24, 1960   4 Sheets-Sheet 1

Ora F. Lohse
INVENTOR.

March 24, 1964 — O. F. LOHSE — 3,126,155

SILVER IODIDE CLOUD SEEDING GENERATOR

Filed May 24, 1960 — 4 Sheets-Sheet 2

Ora F. Lohse
INVENTOR.

BY *Clarence A. O'Brien and Harvey B. Jacobson*
Attorneys

March 24, 1964  O. F. LOHSE  3,126,155
SILVER IODIDE CLOUD SEEDING GENERATOR
Filed May 24, 1960  4 Sheets-Sheet 3
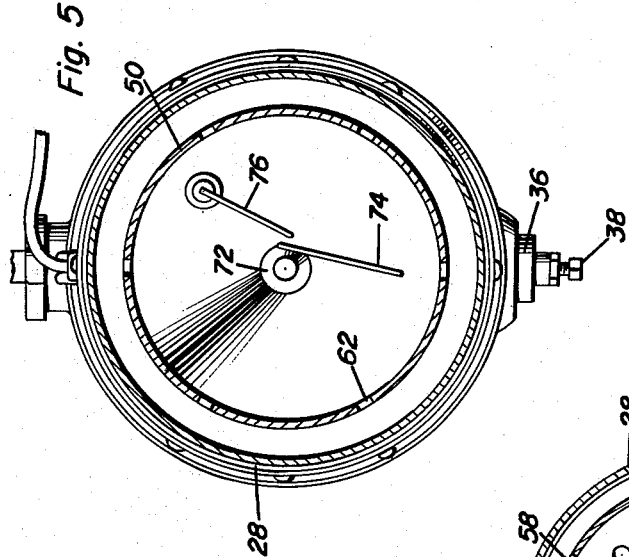
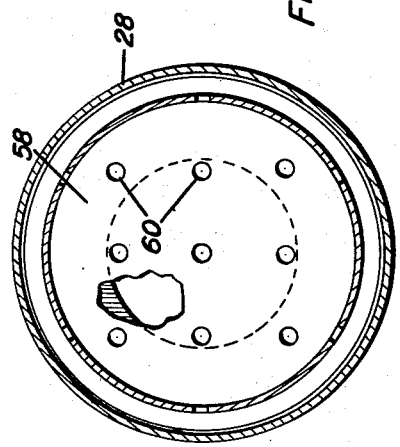
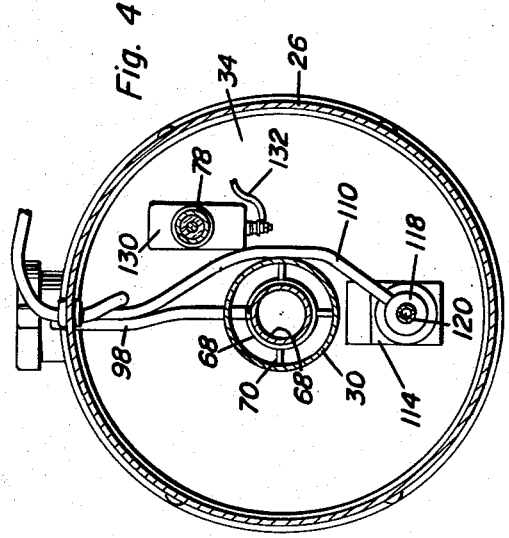
Ora F. Lohse
INVENTOR.

March 24, 1964   O. F. LOHSE   3,126,155
SILVER IODIDE CLOUD SEEDING GENERATOR
Filed May 24, 1960   4 Sheets-Sheet 4

Ora F. Lohse
INVENTOR.

BY *Clarence A. O'Brien*
and *Harvey B. Jacobson*
Attorneys

United States Patent Office 3,126,155
Patented Mar. 24, 1964

3,126,155
SILVER IODIDE CLOUD SEEDING GENERATOR
Ora F. Lohse, P.O. Box 356, Valier, Mont.
Filed May 24, 1960, Ser. No. 31,322
9 Claims. (Cl. 239—14)

This invention comprises a novel and useful silver iodide cloud seeding generator and more particularly relates to a cloud seeding apparatus for use in aircraft to induce rainfall, disperse fogs and the like.

It has long been known that silver iodide particles when discharged in a dispersed condition under proper conditions in the atmosphere are effective to precipitate moisture in the atmosphere thus causing rainfall, dispersing fogs and the like. A very effective silver iodide solution for this purpose is one which is dissolved in acetone. In the utilization of such solutions, air is mixed with the solution and combustion is effected at a relatively high temperature, the gaseous products of combustion consisting of and including therein the widely dispersed silver iodide particles which are effective as a cloud seeding agent.

However, since a silver iodide solution is highly corrosive, there has heretofore resulted considerable damage to the generating apparatus with a resultant relatively high cost of upkeep, as well as a considerable loss of time in the utilization of the apparatus while the necessary repairs are being effected.

It is the primary purpose of this invention to provide a silver iodide cloud seeding generator which will largely overcome the aforementioned difficulties arising from the corrosive effects of the silver iodide solution upon the metallic parts of the apparatus.

A further object of the invention is to provide a silver iodide cloud seeding generator which shall be incorporated into a single compact housing or casing whereby the unit may be readily mounted upon or removed from an aircraft; and which by virtue of its simple construction may be operated from a 12 volt source of electric power and with a minimum amount of electrical wiring required for the use of the apparatus.

A further object of the invention is to promote and enhance the safety in the use of a silver iodide cloud seeding generator by providing a construction in which the flow of the silver iodide solution constituting the fuel of the burner element of the generator shall be effected only when there is an air flow velocity through the unit of approximately 90 miles per hour thereby preventing operation of the device other than when the aircraft is in normal flight.

A further object of the invention is to provide a silver iodide cloud seeding generator in accordance with the preceding objects wherein the control of the flow of the solution constituting the combustible fuel of the generator burner is effected without the use of metallic components thereby eliminating the detrimental effects of corrosion upon the fuel feeding system.

A still further object of the invention is to provide a silver iodide cloud seeding generator in accordance with the preceding objects having an improved means for igniting the silver iodide solution comprising the fuel of the burner, and wherein the igniting means shall be readily energized by the conventional electrical circuits of an aircraft.

Yet another purpose of the invention is to provide a silver iodide cloud seeding generator in accordance with the above-mentioned objects which shall be provided with means for automatically purging the system of the corrosive silver iodide solution comprising the fuel of the burner of the generator to thereby substantially eliminate depositions of silver iodide in the fuel feeding and burning system, and thereby minimize damage by corrosion therein.

A still further important object of the invention is to provide a very simple and yet extremely effective control means whereby to open flow of the silver iodide solution from a storage tank into the burner of the generator, and to stop flow therefrom; and to purge the supply system of the silver iodide solution after the flow of silver iodide solution has been shut off; and to effect this control without the use of metallic valves or conduits coming into contact with the solution.

And a final important object of the invention to be specifically enumerated herein resides in the provision of a silver iodide cloud seeding generator in which the silver iodide solution shall be controllably supplied through a venturi in which air is mixed with the solution to the burner of the generator together with means preventing the clogging of the venturi nozzle and associated passages by deposits of silver iodide during periods when the generator is inoperative.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURES 4–6 are vertical transverse sectional views taken substantially upon the planes indicated by the section lines 4—4, 5—5 and 6—6, respectively, of FIGURE 3;

FIGURE 9 is a fragmentary detail view in vertical longitudinal section through a portion of the fuel tank and sump of the generator;

FIGURE 10 is a fragmentary view in vertical section through a portion of the flow control means of the device.

Figure 1:
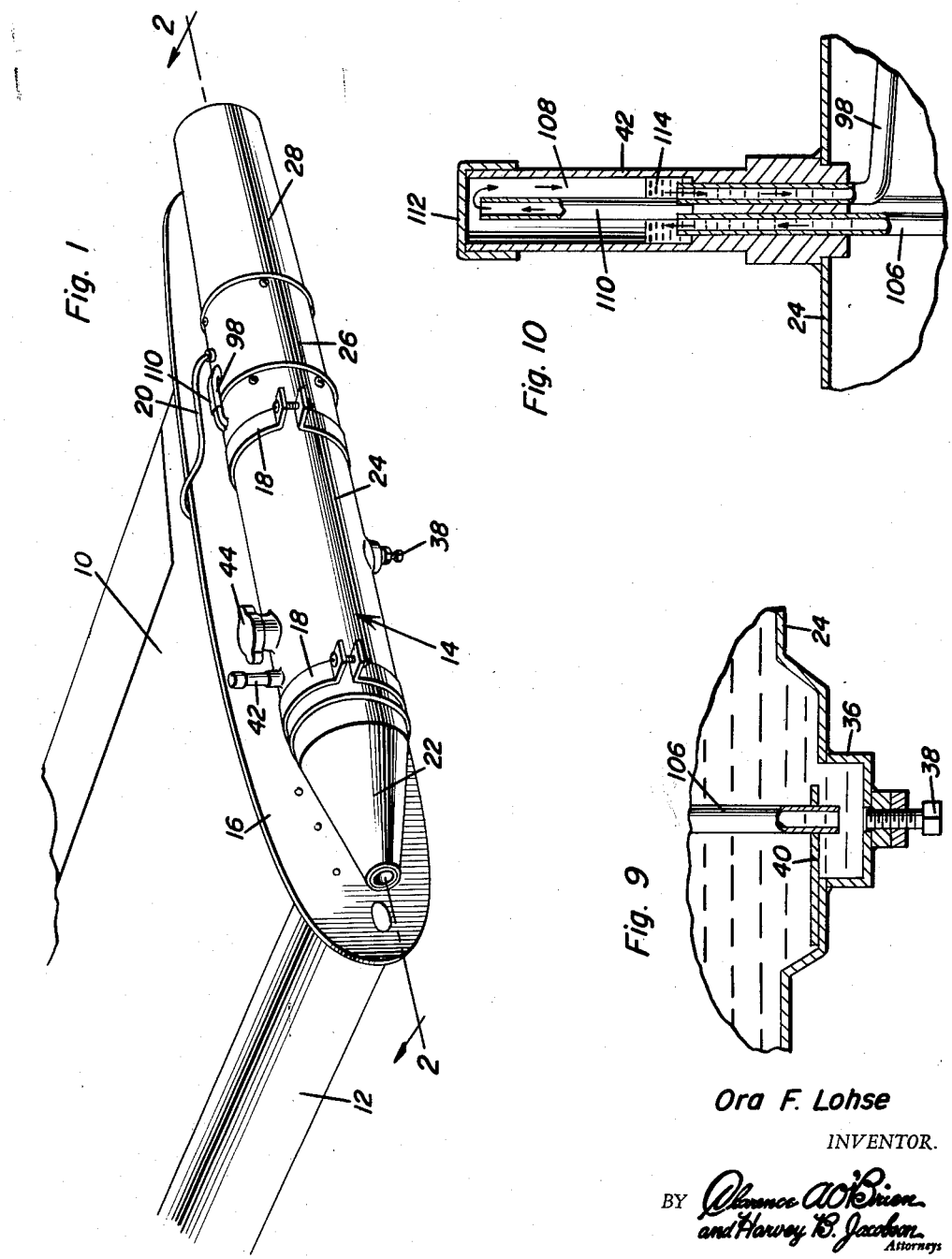
FIGURE 1 is a fragmentary perspective view of a portion of one wing tip of an aircraft showing the silver iodide cloud seeding generator of this invention releasably clamped upon the exterior thereof in an operative position.

In the accompanying drawings the numeral 10 designates the end portion of an aircraft wing of which the numeral 12 refers to the leading edge thereof. The silver iodide generator in accordance with this invention consists of a unitary assembly indicated generally by the numeral 14 and which is removably secured to the outer end 16 of the wing 10 as by clamps 18 in such a manner that the generator is fixedly but removably connected to and carried by the aircraft wing. As set forth hereinafter, the electrical ignition and control system of the generator is connected by suitable electrical conduits as at 20 to the electrical system of the aircraft, not shown, whereby control and operation of the generator may be effected.

Figure 2:
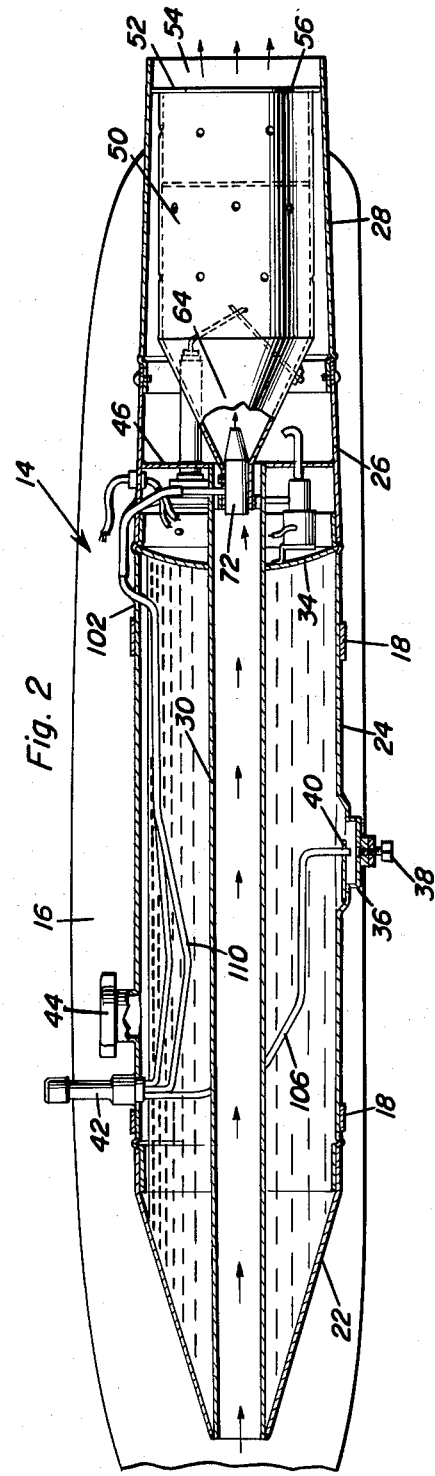
FIGURE 2 is a view in vertical central longitudinal section through the generator of FIGURE 1 taken upon an enlarged scale substantially upon a plane indicated by the section line 2—2 of FIGURE 1, the position of certain concealed parts being shown in dotted lines therein.

Referring now to FIGURE 2 in conjunction with FIGURE 1 it will be understood that generator 14 consists of a single unitary housing or casing of a generally cylindrical shape having a conical nose portion 22 secured to and extending forwardly from a generally cylindrical intermediate body portion 24 to the rear of which is connected a cylindrical continuation 26 comprising an intermediate or connecting housing assembly, together with a burner assembly 28 secured to and extending rearwardly from the intermediate assembly 26. The sections which make up this casing may be constructed of any suitable material and united either detachably or permanently as desired in any preferred manner, these details in themselves forming no part of the present invention claimed herein.

Extending axially from the forward end of the conical nose section 22 and into the intermediate section 26 is a cylindrical member 30 which comprises an air tube by means of which combustion supporting air is delivered into the burner unit. The space surrounding the air tube 30 in the sections 22 and 24 constitutes a storage tank for containing a solution which both constitutes the fuel for the burner unit and which contains the treating agent to be discharged by this apparatus. Although certain features of this invention are not limited to this particular solution, the device is particularly adapted for handling a corrosive solution such as silver iodide dissolved in acetone or the like. A solution of this nature is extremely corrosive to metallic materials with which it comes in contact. Consequently, the sections 22 and 24, together with the exterior surface of the tube 30 may if desired be coated with a corrosion resistant or impervious material, and likewise the partition member 34 which forms the rearward end of the fuel tank may be likewise so coated.

Referring now particularly to FIGURES 2, 9 and 10 in conjunction with FIGURE 1 it will be observed that the fuel tank is provided with a depression or sump 36 therein having a clean-out plug 38 together with a protective baffle or shield 40 overlying the major portion of the sump. A vent device or fuel flow control device 42 is disposed upon the top surface of the fuel tank and extends thereabove for a purpose to be subsequently apparent, and is disposed closely adjacent a filler cap 44 for the fuel tank.

Figure 3:
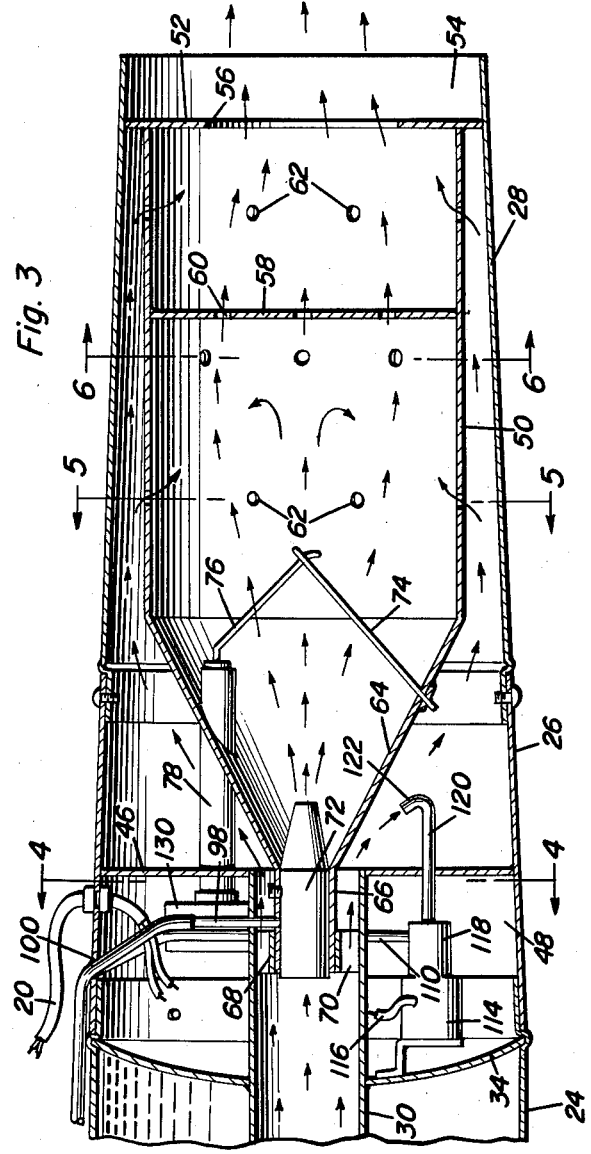
FIGURE 3 is a detail view taken upon an enlarged scale of a portion of FIGURE 2 and showing more clearly the disposition of the mixing venturi with respect to the air feed passage and the burner inlet neck together with the ignition means and a solenoid control means for the apparatus.

Referring now to FIGURES 2 and 3 it will be observed that the housing section 26 has a partition 46 secured therein and extending thereacross which is apertured to receive the end of the tube 30 and is welded or otherwise secured to this tube and to the material of the housing section 26. The space between the partitions 34 and 46 thus constitutes a chamber 48 in which is housed certain control mechanisms of this apparatus as described in detail hereinafter, while the space rearwardly of the partition 46 and extending into and through the main longitudinal portion of the rear section 28 comprises a portion of the combustion unit of the device.

With continuing reference to FIGURE 3 it will be seen that there is disposed in the sections 26 and 28 a generally cylindrical metallic shell 50 which is disposed coaxially with the sections 26 and 28 and is fixedly secured therein. At its rear end the shell 50 is provided with a radial annular flange 52 whose peripheral edge is secured as by welding or the like to the periphery of the section 28 adjacent the open rear end 54 thereof, this flange having a central opening 56 therethrough for a purpose to be subsequently apparent. Intermediate its ends the shell 50 is provided with one or more partitions or baffles 58 extending thereacross, which baffles are provided with a plurality of perforations as at 60 to permit passage of gaseous products therethrough but to somewhat retard the rate of flow thereof. The wall of the shell 50 both forwardly and rearwardly of the partition 58 is provided with a plurality of perforations or openings 62 therethrough for a purpose which will be subsequently apparent.

Figure 7:
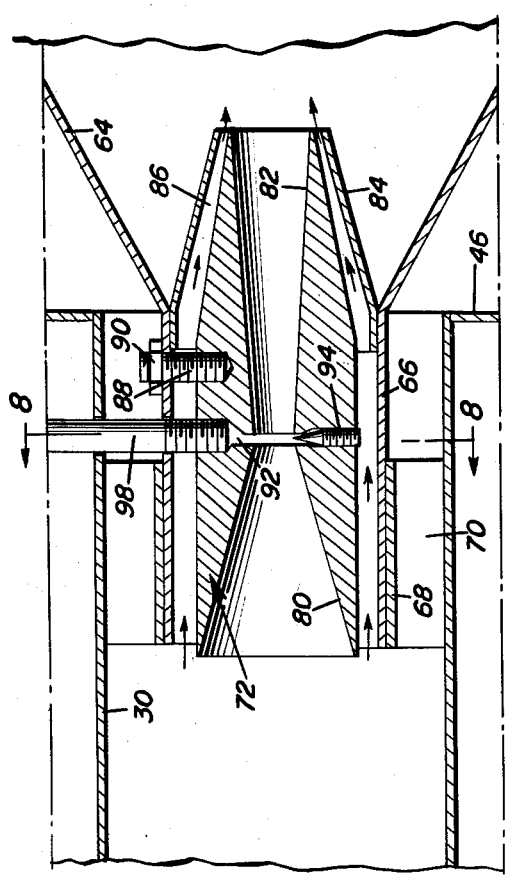
FIGURE 7 is a further detail view taken upon an enlarged scale in vertical central longitudinal section through the venturi and its mounting and showing the means for adjusting the rate of feed of the silver iodide solution fuel to the venturi as well as the means for adjustably mounting the venturi in the inlet neck or throat of the burner element of the device.

At its forward end, the shell 50 is provided with a conical forwardly convergent shoulder portion 64 which terminates in a cylindrical neck portion 66. The conical portion 64 extends through the section 26 while the neck portion 66 extends into the open rearward end of the air tube 30, it being supported in the central support ring 68 of a spider assembly 70 as best seen in FIGURE 7.

From a consideration of FIGURE 3 it will now be observed that the air entering the forward end of the air tube 30 will emerge from the rear end thereof through the partition 46 about the neck 66 of the combustion chamber and then will flow about the shoulder portion 66 and into the narrowing annular space between the shell 50 and the wall of the section 28. During this rearward flow this air will enter the interior of the shell 50 through the opening 62 both forwardly and rearwardly of the partition or baffle 58, will mingle with the combustion products within the burner 50 and will emerge through the opening 56 and be discharged through the open rear end 54 of the device.

It should be observed that this air serves a number of important functions. First, since the velocity of this air is proportional to the speed of the aircraft, being caused to pass through the air tube by the ram effect of the movement of the plane through the air, it will have a great cooling action both upon the tube 30 and the solution in the storage tank which surrounds this tube forwardly of the partition 34; and also will exert a cooling effect upon the shoulder 64 and upon the exterior surface of the shell 50 of the burner unit.

Further, this air will serve to supplement or may in some instances provide the major portion or even all of the combustion supporting air within the burner unit 50. Still further, this air mingling with the combustion products within the shell 50 will serve to increase the volume thereof and dilute the same, thereby resulting in a greater volume of gases generated and discharged by the unit, as well as lowering the temperature of such gases. This in turn effects a greater and more effective dispersion of the solid particles of silver iodide carried by the gases to thereby render the seeding operation more effective.

Disposed in the neck 66 of the burner unit where the latter rests in and is supported by the ring 68 of the spider support means 70 is a charge forming or mixing device indicated by the numeral 72. This device which is illustrated in greater detail in FIGURES 7 and 8 and will be specifically described hereinafter serves as a means to mix the corrosive fuel solution from the storage tank in the casing sections 22 and 24 with air from the air tube 30 to produce a combustible mixture which is discharged thereby into the forward end of the combustion chamber within the burner or shell 50. A suitable electrical igniter, see FIGURE 3, which may conveniently consist of a stationary ground electrode 74 and a live electrode 76 which is insulated within a tubular housing 78 extending from the interior of the burner unit through the partition 46 and into the chamber 48, is provided so that when a spark is caused to occur between the electrodes 74 and 76 in the path of travel of the incoming combustible mixture, the latter will be ignited. It is contemplated that the heat of combustion will be sufficient once ignition has been established, to maintain combustion as long as a combustible mixture is introduced through the neck portion of the burner unit. The igniting device is connected in any suitable manner to the previously mentioned conduit system 20 so that the operation of the igniter may be controlled from the cockpit of the plane. An important advantage of this system is that a low voltage ignition system is employed as for example 12 volts with a minimum amount of electric cables being required for this purpose.

Figure 8:
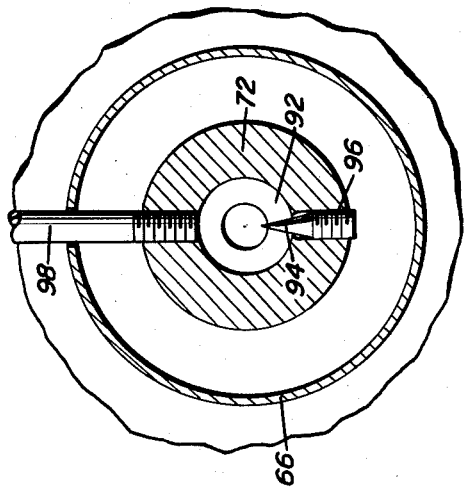
FIGURE 8 is a detail view in vertical transverse section taken substantially upon the plane indicated by the section line 8—8 of FIGURE 7 and showing further details of the fuel control means for the venturi.

Referring now more specifically to FIGURES 7 and 8, will be observed that the mixing device 72 comprises a venturi having a relatively large diameter internal conical surface portion 80 at its forward end within the tube 30, and a relatively small diameter internal conical surface portion 82 at its discharge end which projects into the shoulder portion 64 of the shell 50 of the burner unit. A conical sleeve 84 is provided which is mounted within the neck portion 66 and surrounds the outlet end portion of the venturi 72 in order to provide a narrowing annular passage 86 therebetween through which additional air from the tube 30 flows as shown by the arrows in FIGURE 7. This additional air from the passage 86 mingles with the air and fuel emerging from the venturi to effect a further intimate mixing action of the fuel and air.

The venturi itself is adjustably mounted in an axial position in the throat or neck portion 66, being carried by a supporting stud or fastener 88 having a lock nut 90 by which proper adjustment of the venturi with respect to the axis of the neck portion is effected. As will be understood a number of these fastening studs can be provided if desired to facilitate accurate adjustment of the position of the venturi.

At its narrowest internal diameter, the venturi is provided with an annular peripheral groove 92 and one or more needle pointed screws 94 are threaded in bores 96 in the wall of the venturi with their points projecting into the flow passage of the venturi as shown in FIGURE 8 to thereby adjustably regulate flow of air therethrough. Opening into the annular channel or passage 92 is one end of a fuel supply conduit 98, this conduit in turn extending through an opening 100, see FIGURE 3, in the wall of the section 26 and then through a further opening 102, see FIGURE 2, passing into the fuel tank of the section 24. The conduit 98 may be sectional, may be flexible in whole or in part, and is preferably of a plastic or other suitable corrosion impervious or corrosion resisting material. At its forward end, the conduit 98 enters the vent body 42, as shown in FIG. 10.

Referring now to FIGURE 2 it will be observed that there is provided a further fuel conduit 106 which at its lower end, see FIGURE 9, is secured to and extends through the baffle 40 and into the sump 36 for drawing fuel from the bottom of the sump, and at its upper end, as shown in FIGURE 10, enters the vent body 42.

Referring now particularly to FIGURE 10 it will be observed that the vent body 42 has the exit of the conduit 106 and the adit of the conduit 98 sealed in the wall of the lower portion of the body and opening into a vent chamber 108 therein. Also opening through the lower wall of the body 42 and to an upper portion of the vent chamber is the discharge end of a conduit 110 which constitutes a vent conduit by which air under control means to be subsequently set forth may be introduced into the vent chamber 108.

The upper end of the chamber 108 of the vent body 42 is provided with a closure cap 112 which may be removable if desired. By means of this closure cap the chamber 108 is sealed from the atmosphere except during the operation of the vent tube 110 to be later set forth. Consequently, when the tube 110 is closed to the atmosphere, the slip stream or ram effect of the flow of air through the air tube 30 into the burner combustion chamber and through the venturi 72 will cause a suction in the fuel supply conduit 98 which will thus produce a vacuum or reduced pressure in the chamber 108. This reduction in pressure will in turn through the conduit 106 draw fuel from the storage tank so that fuel will accumulate as indicated at 114 in the lower portion of the chamber 108.

It is a very important feature of this invention that the sizes, dimensions and dispositions of the venturi 72 and of the conduits 98 and 106 shall be such that sufficient suction to cause flow of fuel from the tank to the vent body and from the latter to the venturi or mixing device will occur only when the rate of air flow through the air tube is of such a value as will correspond to a desired cruising speed of the aircraft upon which the device is mounted, as for example an air flow of about 90 miles per hour. An important advantage of this arrangement is that when the air flow is less than this predetermined value, such as would arise from an insufficient air speed or no air speed of the plane, there will be no flow of the fuel thus preventing operation of the burner.

It should be understood that the material of the vent body 42 as well as of the associated conduits 98 and 106 shall be of a corrosion resistant or impervious material so as to be not affected by the detrimental action of the corrosive nature of the fuel supplied to the burner and from which is generated the cloud seeding gases.

When the vent conduit 110 is open to the atmosphere by control means to be subsequently described, atmospheric air will flow into the chamber 108 breaking the vacuum or pressure reduction. This controlled air inlet serves the very important function of stopping further flow of fuel from the storage tank into the burner; and also supplies air as a purging fluid which will cleanse the fuel supply conduit 98, the vent chamber 108 in the vent body 42, the venturi 72 and its passages, and also the interior of the burner itself. Thus, when the supply of fuel is cutoff by opening the vent conduit 110 to air, a purging or purifying operation is also automatically effected thereby preventing corroding of various surfaces of the device which might arise from deposits of silver iodide remaining thereon after the operation of the burner has ceased.

Referring now particularly to FIGURES 2, 3 and 4, it will be seen that there is suitably mounted within the chamber 48 a solenoid 114 having a conductor 116 by which current is supplied thereto through the previously mentioned conduit system 20. This solenoid in turn operates an air valve 118 which has an air inlet tube 120 with an adit portion 122 disposed as shown in FIGURE 3 in the path of flow of air emerging from the tube 30 into the interior of the casing section 26 to the right of the partition 46. When the valve 118 is opened by energization of the solenoid 114 this air stream passing at high velocity through the tube 30 is inducted into the tube 120, and then passes by the tube 110, which may also pass through the openings 100 and 102 previously mentioned in the wall of the casing section 24 into the vent body 42. As will be readily understood, operation of the solenoid valve 118 will be controlled by the pilot of the plane and will be effective to break the vacuum existing within the chamber 108 and thus control the flow of the corrosive fuel from the storage tank to the mixing device without the use of any mechanical or metallic valves or other elements.

Figure 11:
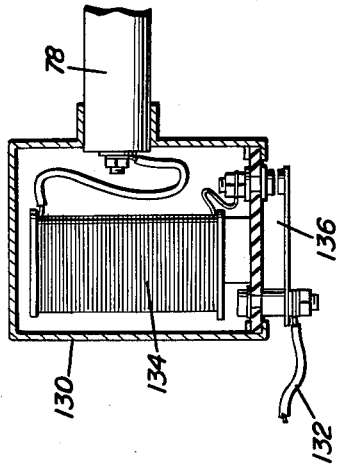
FIGURE 11 is a detail view in vertical section through a portion of the igniting means of the device.

Referring now to FIGURE 11 in conjunction with FIGURES 2–4 it will be seen that there is provided as a part of the ignition system, a housing or chamber 130 suitably mounted in the compartment 48 and into which one end of the tube 78 of the spark plug electrode 76 extends. From the previously mentioned electrical conduit system 20 there extends a conductor 132 which is connected with a vibrator coil 134 housed within the casing 130 with a conventional make-and-break device 136. The arrangement is such that the low voltage current from the electrical system of the plane operates the vibrator coil and will induce a spark across the gap formed between the two electrodes 76 and 74 in order to initiate combustion in the burner unit.

In operation the combustible mixture of the corrosive fuel and combustion supporting air delivered from the venturi 72 is further mixed with additional supplementary air from the annular chamber lying within the conical member 84 as shown in FIGURE 7 so as to produce a flame which substantially fills the shell 50. The products of combustion which are further augmented by the additional air coming through the apertures 62 is then discharged as a gas containing the solid particles of silver iodide to effect the seeding operation in a conventional manner.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A generator for producing silver iodide cloud seeding gases comprising a tank for storing a corrosive fuel containing a silver iodide cloud seeding agent, a burner for effecting combustion of said corrosive fuel and having exhaust means for discharging the gases of combustion to the atmosphere, corrosion resistant conduit means for supplying corrosive fuel from said tank to said burner, control means unaffected by the corrosive action of said corrosive fuel for simultaneously stopping flow of corrosive fuel through said fuel supply means and for effecting flow of air as a purging fluid through the latter, said fuel supply means including conduits of a non-corrosive material connecting said tank to said control means and the latter to said burner and through which corrosive fuel is drawn from the fuel tank by suction from the burner, said flow control means including a vent conduit opening to the atmosphere and communicating with said conduits and introducing air thereinto to break the suction on the corrosive fuel and to purge with air said conduits and burner of corrosive fuel.

2. The generator of claim 1, wherein said control means includes a solenoid valve controlling communication of said vent with the atmosphere.

3. A generator for producing cloud seeding gases comprising a tank for storing a corrosive fuel containing silver iodide as a liquid cloud seeding agent, a burner for effecting combustion of said corrosive fuel and producing exhaust gases therefrom, said burner having exhaust means for discharging to the atmosphere said exhaust gases, corrosion resistant conduit means for supplying said corrosive fuel from said tank to said burner, means disposed in said conduit means and resistant to the corrosive action of said corrosive fuel for simultaneous stopping flow of corrosive fuel through said fuel supply means and for effecting flow of air as a purging fluid through the latter, said fuel supply means including conduits of a noncorrosive material connecting said tank to said burner and through which said corrosive fuel is drawn from the tank by suction from the burner, said flow control means including a passage communicating with the atmosphere and with said conduits and introducing air thereinto to break the suction of the corrosive fuel and to purge with air said conduits and burner of corrosive fuel.

4. The generator of claim 3 wherein said control means includes a solenoid actuated valve controlling communication of said passage with the atmosphere.

5. A silver iodide cloud seeding generator comprising a housing secured to the exterior surface of an aircraft on a wing tip thereof, a burner in said housing having an exhaust pipe opening through the rear of said housing, a storage tank in said housing for a corrosive silver iodide solution as a burner fuel, an air tube opening through the forward end of said housing and discharging into said burner, a mixing venturi in said air tube, means for feeding fuel from said storage tank into said venturi for mixing with air flowing therethrough whereby to provide a combustible mixture for said burner, corrosion impervious means for controlling flow of said fuel from said storage tank to said venturi, means for effecting ignition of said combustible mixture in said burner, means connected with said control means for purging said burner and fuel supply means of corrosive fuel when flow of fuel from said tank to said burner is cut off.

6. A silver iodide cloud seeding generator comprising a housing carrying all of the elements of the generator, means for mounting said housing entirely upon the exterior of the fuselage of a plane and remote therefrom, said housing having a fuel tank within its forward portion for a corrosive and combustible solution of silver iodide and a burner within its rear portion having an exhaust nozzle opening rearwardly of said housing, an air supply conduit extending through said tank and establishing continuous communication between the atmosphere and said burner, fuel feeding means including corrosion resistant conduits disposed in said tank and conducting fuel from said tank to said burner, a corrosion resistant flow control means interposed in said fuel feeding means, said flow control means comprising a body having a vacuum chamber connected by said conduit means to said tank and burner, venting means including a vent conduit communicating with said vacuum chamber and with said air supply conduit.

7. The combination of claim 6 wherein said air supply conduit extends axially through said tank and opens at the front of said housing whereby a flow of air is effected therethrough by ram action.

8. The combination of claim 6 including a control valve disposed in said vent conduit for controlling air flow therethrough and whereby to break the suction in said vacuum chamber for stopping flow of fuel therethrough and for inducting air for purging said conduit means and said burner of corrosive fuel.

9. The combination of claim 6 including an air and fuel mixer disposed in said air delivery conduit at its junction with said burner, said mixer including a venturi through which and about which air in said delivery conduit flows, said fuel feeding means corrosion resistant conduit connecting said vacuum chamber with said venturi.

References Cited in the file of this patent

UNITED STATES PATENTS

| | | |
|---|---|---|
| 2,476,171 | Williams | July 12, 1949 |
| 2,611,992 | Loy et al. | Sept. 30, 1952 |
| 2,686,944 | Gubelin | Aug. 24, 1954 |
| 2,715,813 | Holmes et al. | Aug. 23, 1955 |
| 2,756,097 | Brandau et al. | July 24, 1956 |

FOREIGN PATENTS

| | | |
|---|---|---|
| 522,163 | France | Mar. 22, 1921 |